United States Patent
Achan et al.

(10) Patent No.: US 11,770,407 B2
(45) Date of Patent: Sep. 26, 2023

(54) METHODS AND APPARATUSES FOR DEFENDING AGAINST DATA POISONING ATTACKS IN RECOMMENDER SYSTEMS

(71) Applicant: Walmart Apollo, LLC, Bentonville, AR (US)

(72) Inventors: Kannan Achan, Saratoga, CA (US); Durga Deepthi Singh Sharma, Bangalore (IN); Behzad Shahrasbi, Santa Clara, CA (US); Saurabh Agrawal, Bangalore (IN); Venugopal Mani, Sunnyvale, CA (US); Soumya Wadhwa, Sunnyvale, CA (US); Kamiya Motwani, Madhya Pradesh (IN); Evren Korpeoglu, San Jose, CA (US); Sushant Kumar, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 390 days.

(21) Appl. No.: 17/147,017

(22) Filed: Jan. 12, 2021

(65) Prior Publication Data

US 2022/0224717 A1 Jul. 14, 2022

(51) Int. Cl.
*H04L 9/40* (2022.01)
*G06Q 30/0601* (2023.01)
*G06N 20/00* (2019.01)
*G06Q 30/018* (2023.01)
*G06Q 50/26* (2012.01)
*G06F 16/9535* (2019.01)

(52) U.S. Cl.
CPC ...... *H04L 63/1466* (2013.01); *G06F 16/9535* (2019.01); *G06N 20/00* (2019.01); *G06Q 30/0185* (2013.01); *G06Q 30/0631* (2013.01); *G06Q 50/265* (2013.01)

(58) Field of Classification Search
None
See application file for complete search history.

(56) References Cited

U.S. PATENT DOCUMENTS 8,464,346 B2  6/2013  Barai et al.
8,566,928 B2  10/2013  Dagon et al.

OTHER PUBLICATIONS

Bo, Li, Data Poisoning Attacks on Factorization Based Collaborative Filtering, Oct. 5, 2016 (Year: 2016).*

(Continued)

*Primary Examiner* — Cai Y Chen
(74) *Attorney, Agent, or Firm* — Morgan, Lewis & Bockius LLP; Manita Rawat (57) ABSTRACT

A recommender system can include a defender computing device that is configured to obtain customer interaction data characterizing customer interactions with an ecommerce marketplace. The defender computing device can also be configured to determine an item recommendation based on the customer interaction data using a trained differentially private recommendation model and send the item recommendation to the customer. The trained differentially private recommendation model is more likely to determine the same item recommendation after poisoned data is injected into the customer interaction data than a recommendation model that is not privately trained.

17 Claims, 7 Drawing Sheets

(56) References Cited

OTHER PUBLICATIONS

Ziqi Liu, Fast Differently Private Matrix Factorization, May 7, 2015 (Year: 2015).*
Fang et al., "Poisoning Attacks to Graph-Based Recommender Systems", 2018, p. 1-12.
Li et al., "Data Poisoning Attacks on Factorization-Based Collaborative Filtering", 2016, p. 1-9.
Fang et al., "Influence Function based Data Poisoning Attacks to Top-N Recommender Systems", 2020, p. 1-9.
Hao et al., "Detecting Shilling Attacks with Automatic Features from Multiple Views", 2019, p. 1-14.
Li, Bo et al., "Data Poisoning Attacks on Factorization-Based Collaborative Filtering", (NIPS 2016), arXiv:1608.08182v2; Oct. 5, 2016, 13 pages.
Li, Ziqi et al., "Fast Differentially Private Matrix Factorization", arXiv:1505.01419v2, May 7, 2015, 13 pages.
Ma, Yuzhe, "Data Poisoning against Differentially-Private Learners: Attacks and Defenses", Proceedings of the 28th International Joint Conference on Artificial Intelligence (IJCAI-19), Aug. 10-16, 2019, pp. 4732-4738.

\* cited by examiner

METHODS AND APPARATUSES FOR DEFENDING AGAINST DATA POISONING ATTACKS IN RECOMMENDER SYSTEMS

TECHNICAL FIELD

The disclosure relates generally to methods and apparatuses for defending against data poisoning attacks in recommender systems.

BACKGROUND

At least some ecommerce marketplaces can include recommender systems that can provide recommendations to customers that may be shopping, browsing or otherwise interacting with the marketplace. Malicious users can make various efforts in order to change, corrupt or otherwise influence the recommendations that are made to customers. One way that such malicious users may attempt to influence the recommendations of recommender systems in ecommerce marketplaces is to inject fake actions into the ecommerce marketplace. These fake actions can be fake views, fake ratings, fake purchases, fake adds to carts and other fake marketplace interactions.

These fake interactions can cause data poisoning to occur in which the recommendations of recommender systems can be corrupted. The corrupted recommender systems can determine different recommendations than they would otherwise determine had the malicious user not injected the fake marketplace interactions into the data used by the recommender systems. Data poisoning of recommender systems is undesirable because items may be recommended to customers that would not have otherwise have been recommended to the customer. This can lead to increased returns, customer dissatisfaction and a loss of good will between a retailer and the customer. Such undesirable outcomes can, in turn, lead to increased costs and lower revenue for the retailer. There exists a need, therefore, for improved methods and apparatuses to defend against data poisoning in recommender systems.

SUMMARY

The embodiments described herein are directed to a recommender system and related methods. The recommender system can be implemented using one or more computing devices that can include operative elements that can determine a recommendation that can be delivered to customer on an ecommerce marketplace. The recommender system can include a defender computing device that performs operations to mitigate the effects of a data poisoning attack that may insert poisoning data into the customer data used by the recommender system. The defender computing device can, in one example, use differentially private matrix factorization instead of traditional recommender models or methods to reduce the likelihood that recommendations are effected by the data poisoning attack. The recommender systems of the present disclosure can improve a retailer's ability to defend against data poisoning attacks. This can, in turn, improve a retailer's financial performance by improving revenues and decreasing costs and improve customer satisfaction.

In accordance with various embodiments, exemplary systems may be implemented in any suitable hardware or hardware and software, such as in any suitable computing device. For example, in some embodiments, a system can include a computing device configured to obtain customer interaction data characterizing customer interactions with an ecommerce marketplace and determine an item recommendation based on the customer interaction data using a trained differentially private recommendation model. The computing device can also send the item recommendation to the customer.

In another aspect, trained differentially private recommendation model can be more likely to determine the same item recommendation after poisoned data is injected into the customer interaction data than a recommendation model that is not privately trained.

In another aspect, the trained differentially private recommendation model can include a trained differentially private machine learning model.

In another aspect, the trained differentially private recommendation model can be trained using differentially private matrix factorization.

In another aspect, the differentially private matrix factorization can use posterior sampling to preserve differential privacy.

In another aspect, the posterior sampling can use Stochastic Grandient Langevin Dynamics to sample from the customer data used to train the trained differentially private recommendation model. In another aspect, the posterior sampling can use Stochastic Gradient Langevin Dynamics to sample the user and item latent representations while training differentially private matrix factorization.

In another aspect, the customer interaction data can include rating data that characterizes a rating of an item in the ecommerce marketplace.

In another aspect, the recommendation can include a recommendation for an item other than an item purchased or rated by a customer on the ecommerce marketplace.

In another aspect, the trained differentially private recommendation model can be trained using a training method that includes obtaining customer data characterizing interactions with an ecommerce marketplace for a plurality of customers, modifying the customer data using a privacy engine that samples, trims or re-weighs the customer data to obtain a modified customer data set, and training a machine learning model using the modified customer data set.

In various embodiments of the present disclosure, a method of defending against data poisoning attacks is provided. In some embodiments, the method can include obtaining customer interaction data characterizing customer interactions with an ecommerce marketplace and determining an item recommendation based on the customer interaction data using a trained differentially private recommendation model. The method can also include sending the item recommendation to the customer.

In various embodiments of the present disclosure, a non-transitory computer readable medium is provided. The non-transitory computer readable medium can have instructions stored thereon, wherein the instructions, when executed by at least one processor, cause a device to perform operations that include obtaining customer interaction data characterizing customer interactions with an ecommerce marketplace and determining an item recommendation based on the customer interaction data using a trained differentially private recommendation model. The instructions can further cause the device to send the item recommendation to the customer.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some ecommerce marketplaces, the marketplace can include a recommender system that can operate to provide recommendations to the customers that are using the marketplace. The recommender systems can, for example, provide recommendations to the customers such as recommended substitute items, recommended items for purchase or other recommendations on the ecommerce marketplaces. These recommendations can be presented or displayed to the customers by showing such recommended item on the ecommerce marketplace website. Because the recommendations are presented to customers by the retailer's ecommerce marketplace, malicious actors can be motivated to influence the recommendations. The malicious actors can, for example, have a desire to make Target items be displayed as a recommended items. The Target item can, for example, be new items, counterfeit items, or other items that are not being displayed by the recommender system.

The malicious users can execute a data poisoning attack and inject poisoning data into the ecommerce marketplace. The data poisoning attack can inject poisoning data into the ecommerce marketplace, for example, by creating fake users, fake reviews, fake purchases, fake product views, and other fake transaction data. The intent of the malicious users can be to raise the visibility of its Target items by injecting this poisoning data into the ecommerce marketplace.

The methods and apparatuses of the present disclosure can defend against such data poisoning attack to reduce the likelihood that the Target items of the malicious user are displayed as recommended items by the retailer's recommender system. The recommender systems of the present disclosure can be more likely to recommend the same items that were recommended before the data poisoning attack. As will be further described below, the recommender systems of the present disclosure can include differential privacy to defend against data poisoning attacks.

Figure 1:
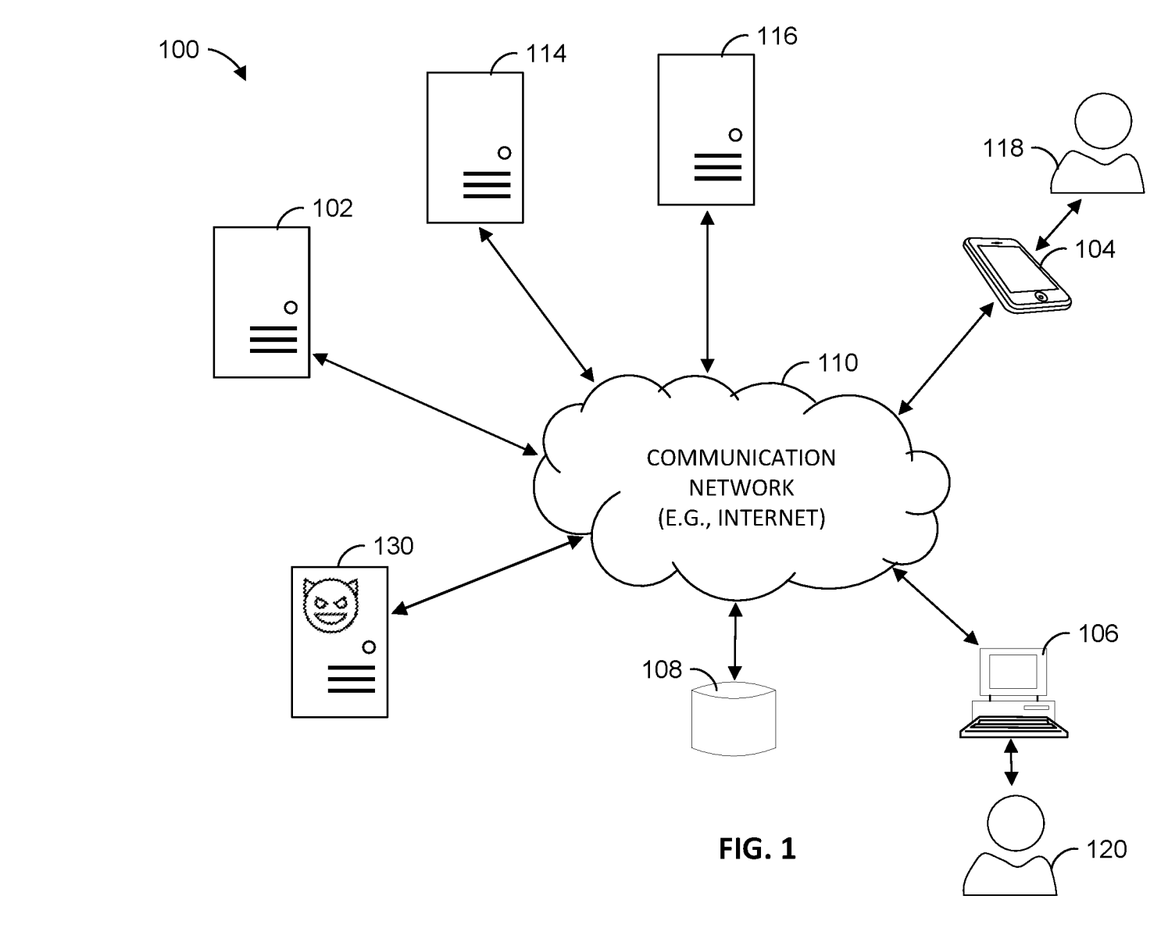
FIG. 1 is a block diagram of a recommender system in accordance with some embodiments.

Turning to the drawings, FIG. 1 illustrates a block diagram of a recommender system 100 that includes a defender computing device 102 (e.g., a server, such as an application server), a central ordering computing device 114, an external information source 116 (e.g., a web server), a database 108, and multiple customer computing devices 104, 106 operatively coupled over network 110. A data poisoning computing device 130 can also be coupled to the network 110. Defender computing device 102, central ordering computing device 114, external information source 116, data poisoning computing device 130, and multiple customer computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, defender computing device 102 can be a computer, a workstation, a laptop, a server such as a cloud-based server, or any other suitable device. In some examples, each of multiple customer computing devices 104, 106 can be a cellular phone, a smart phone, a tablet, a personal assistant device, a voice assistant device, a digital assistant, a laptop, a computer, or any other suitable device. In some examples, defender computing device 102 and the central ordering computing device 114 is operated and/or controlled by a retailer, and multiple customer computing devices 104, 106 are operated by customers of the retailer. The data poisoning computing device 130 can be operated by a malicious user, hacker or other entity attempting to corrupt the recommender system 100.

The central ordering computing device 114 can be distributed among one or more workstations or servers that are coupled together over the network 110. The central ordering computing device 114 can cause an ecommerce marketplace to be displayed or otherwise communicated via one or more websites. The customers 118, 120 can view, browse and order items that may be made available via the ecommerce marketplace. The central ordering computing device 114 can collect information for such orders including item information, payment information, delivery information and the like. The central ordering computing device 114 can store such information and/or send such information for storage in the database 108 or in other components of the recommender system 100.

Defender computing device 102 can also be operable to communicate with database 108 over the communication network 110. The database 108 can be a remote storage device, such as a cloud-based server, a memory device on another application server, a networked computer, or any other suitable remote storage. Although shown remote to defender computing device 102, in some examples, database 108 can be a local storage device, such as a hard drive, a non-volatile memory, or a USB stick.

Communication network 110 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The customer computing devices 104, 106 may communicate with the central ordering computing device 114 over communication network 110. For example, the central ordering computing device 114 may host one or more websites. Each of the customer computing devices 104, 106 may be operable to view, access and interact with the websites hosted by the central ordering computing device 114. In some examples, the central ordering computing device 114 can allow a customer 118, 120, via the customer computing devices 104, 106, to browse, search and/or select products for purchase. As will be further explained, the central ordering computing device 114 can also display recommendations via the customer computing device 104, 106. These recommendations can display items that the recommender system 100 has determined may be of interest to the customers 118, 120.

The data poisoning computing device 130 can be operated by a malicious user, for example. The malicious user may inject poisoning data into the recommender system 100 by creating fake profiles, submitting fake reviews, submitting fake transactions or taking other actions with the intent to influence the recommendations that are delivered to the customer 118, 120. The injection of the poisoning data can for example increase the likelihood that a particular item will be recommended by the recommender system 100. In other examples, the poisoning data can compromise the quality of the recommendations such that customer 118, 120 can lose trust in the website. The defender computing device 102 can operate to minimize the effects of the data poisoning computing device 130 in influencing the results of the recommender system 100.

Figure 2:
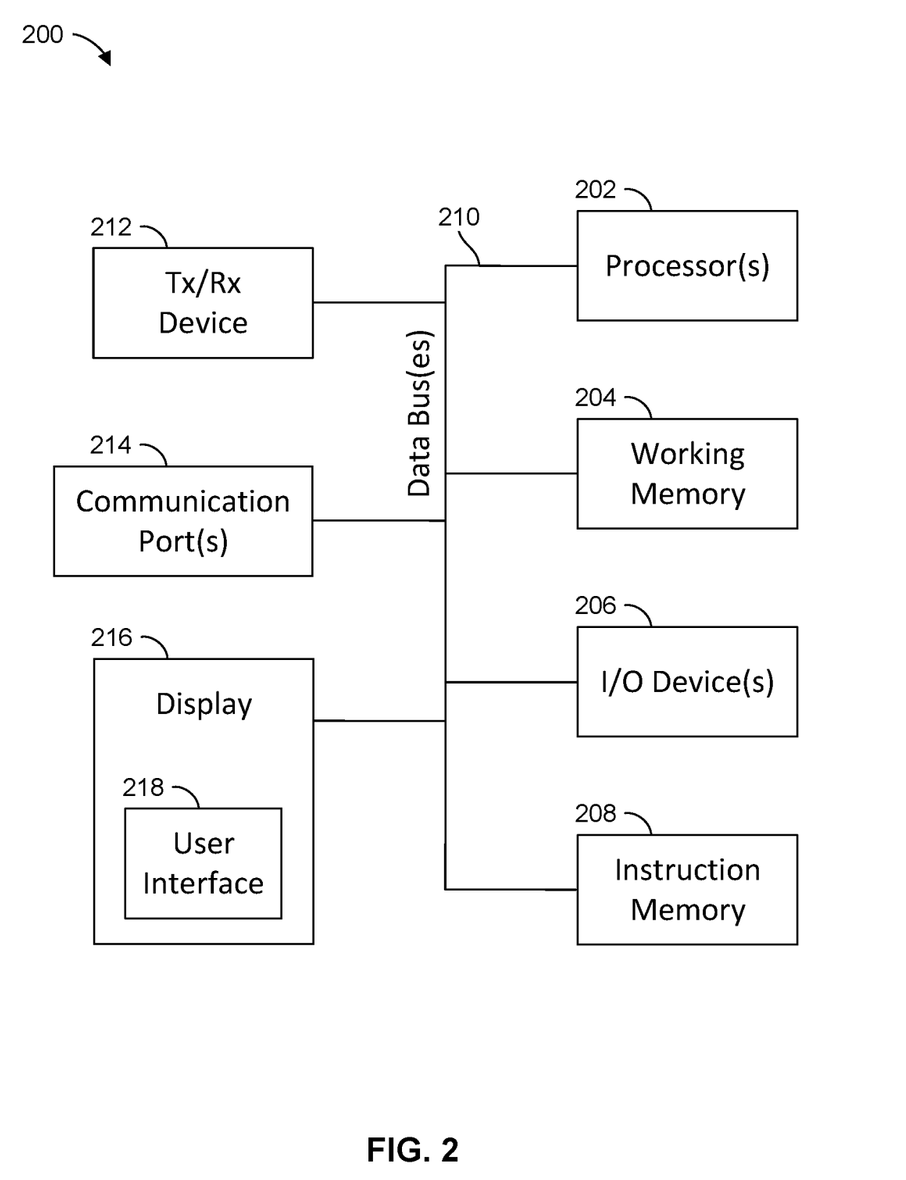
FIG. 2 is a block diagram of a computing device of the defender system of FIG. 1 in accordance with some embodiments.

FIG. 2 illustrates an example computing device 200. The defender computing device 102, the central ordering computing device 114, the external information source 116, and/or the customer computing devices 104, 106 may include the features shown in FIG. 2. For the sake of brevity, FIG. 2 is described relative to the defender computing device 102. It should be appreciated, however, that the elements described can be included, as applicable, in the central ordering computing device 114, the external information source 116, and/or the customer computing devices 104, 106.

As shown, the defender computing device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the defender computing device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as recommendation data and customer interaction data.

Display 216 can display a user interface 218. User interfaces 218 can enable user interaction with the defender computing device 102. For example, user interface 218 can be a user interface that allows an operator to interact, communicate, control and/or modify different features or parameters of the defender computing device 102. The user interface 218 can, for example, display the performance of the defender computing device 102 using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 defender computing device 102 will be operating in. Processor(s) 202 is operable to receive data from, or send data to, a network, such as communication network 110 of FIG. 1, via transceiver 212.

Figure 3:
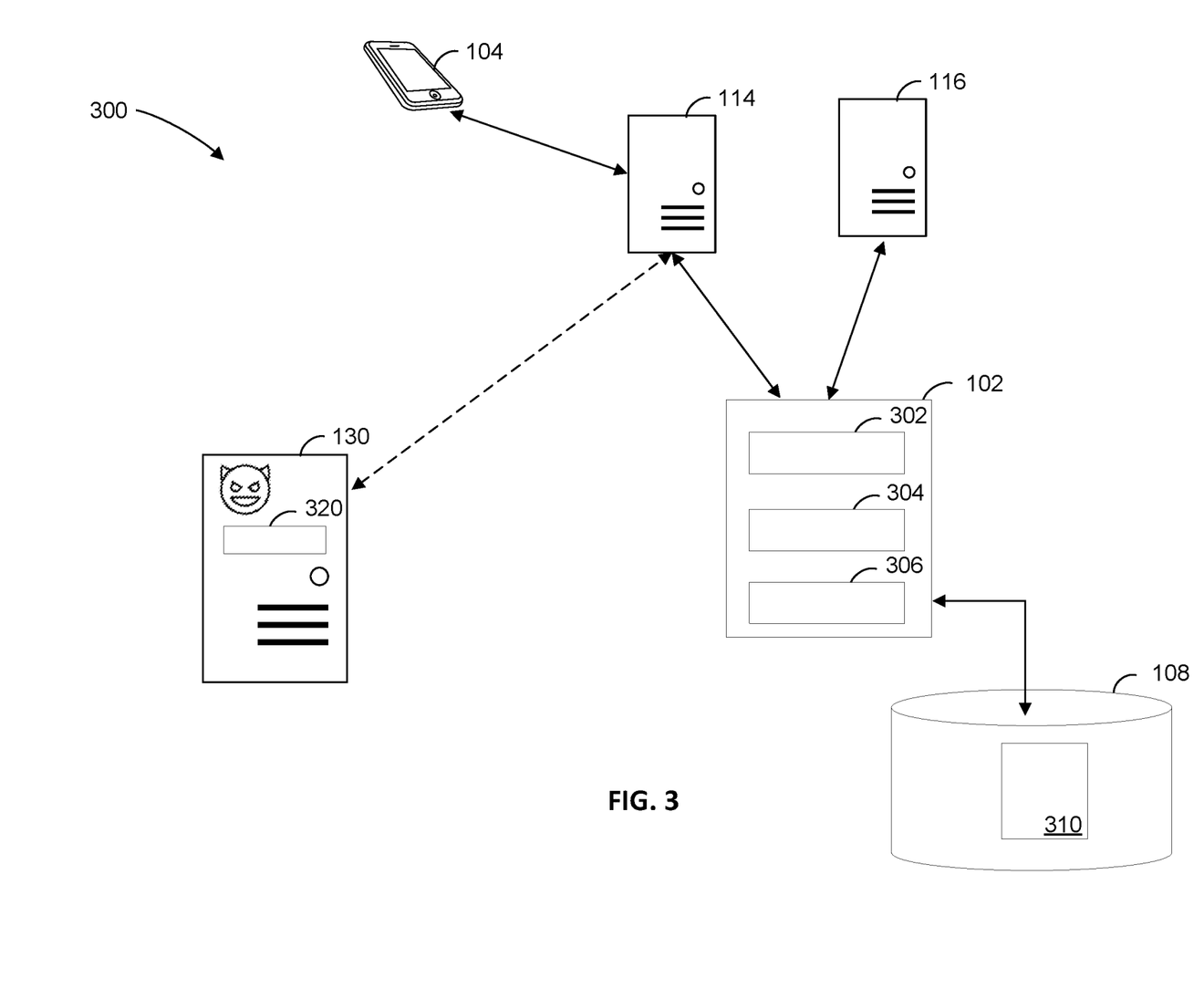
FIG. 3 is a block diagram illustrating examples of various portions of the recommender system of FIG. 1 in accordance with some embodiments.

Turning now to FIG. 3, further aspects of an example recommender system 300 are shown. In this example 300, the elements described below are shown in communication with each other. It should be appreciated, however, that while not shown, the elements in example 300 can be in communication with each other over a communication network (e.g., communication network 110).

As shown, the defender computing device 102 can be coupled to the central ordering computing device 114, the external information source 116, and the database 108. The defender computing device 102 can include a data engine 302 that can obtain different types of information from the central ordering computing device 114, the external information source 116 and/or from the database 108. The data engine 302 can for example obtain the information using application protocol interfaces (APIs) or other suitable methods to obtain the information from the sources described. The data engine 302 can obtain customer interaction data 310, for example. The customer interaction data 310 can be data that characterizes a customer's interaction with the ecommerce marketplace. The customer interaction data 310 can, for example, include ratings that the customer may have submitted for items on the ecommerce marketplace. The customer interaction data can also include, for example, information regarding the views of particular items, the items purchased, the number of purchases, and other information regarding a customer's behavior on the ecommerce marketplace. The customer interaction data can be historical data that is recorded and stored for customer interactions that have occurred in the past. The customer interaction data can also include current data that is recorded and stored for a current session in which the customer is actively browsing and/or otherwise interacting with the ecommerce marketplace. The customer interaction data 310 can, in some examples, be stored in the database 108.

The defender computing device 102 can also include a privacy engine 304. Privacy engine 304 can operate to modify the customer interaction data to make the customer interaction data private such that when the customer interaction data is used by a private recommendation model 306 (further discussed below) that the private recommendation model 306 will be more capable to defend against data poisoning attacks than if the customer interaction data were used in its raw form.

In one example, the privacy engine 304 can operate to make private recommendation model 306 differentially private. Any suitable open source or proprietary tool can be used to make the private recommendation model differentially private. The term private or differentially private as used in this disclosure can be defined as follows. Given a data space Z, let M be a randomized learner and let $$\mathcal{D} = \bigcup_{i=0}^{\infty} Z^i$$

be the space of all training data with $D \in \mathcal{D}$ being a particular data set, such as the customer interaction data. The randomized learner M can be called $(\epsilon, \delta)$ differentially private if $\forall D, D' \in \mathcal{D}$ that differ by one item and for all measurable sets $\mathcal{S} \subset \text{Ranae}(\mathcal{M})$ $$P(\mathcal{M}(D) \in \mathcal{S}) \leq e^{\epsilon} P(\mathcal{M}(D') \in \mathcal{S}) + \delta \qquad \text{**Equation 1}$$

If $\delta=0$, the randomized learner M is considered $\epsilon$-differentially private. As defined above and defined in other terms, if any one data point in the data set (such as the customer interaction data) is modified, the output of the randomized learner will not change by a significant amount. In terms of the defender computing device 102, the randomized learner can be the private recommendation model 306.

The privacy engine 304 can operate to modify the customer interaction data such that the results of the recommendations delivered by the private recommendation model 306 are differentially private.

The private recommendation model 306 can be any suitable algorithm, methodology or model that can determine a recommendation for an item to be purchased by a customer interacting on the ecommerce marketplace. In some examples, the recommendations can be displayed on a webpage while a customer is browsing on a retailer's website. The recommendations can be listed or displayed in various manners and can allow the customer to click on the recommended items to add such items for purchase or as an alternative to an item currently being viewed by the customer. In one example, the private recommendation model 306 can be a machine learning model that is based on collaborative filtering (CF). The collaborative filtering can include, for example, differentially private matrix factorization.

The private recommendation model 306, in one example, can include customer rating data that can include the ratings that customers have entered for various items in the ecommerce marketplace. The customers rating data, however, does not include a rating for every item in the ecommerce marketplace. The private recommendation model 306 can therefore predict a rating for the items that the customers have not rated in the ecommerce marketplace. Matrix factorization can be used to accomplish this task. In this example, the private recommendation model 306 can compute a user matrix U and an item matrix V by minimizing the square of the difference between all observed (or actual ratings) for each user i and each item j as represented by the equation below, where the regularization parameter $(\lambda)$ is a positive constant.

$$\min_{U,V} \sum_{i,j \in \mathcal{R}} (r_{ij} - \langle u_i, v_j \rangle)^2 + \lambda(\|U\|_2^2 + \|V\|_2^2) \qquad \text{**Equation 2}$$

Any suitable method, tool or algorithm can be used to minimize Equation 2. In one example, Equation 2 can be minimized using Stochastic Gradient Descent (SGD).

While the above example was described with respect to a rating, a similar methodology can be used by the private recommendation model 306 to determine recommendations for items in the ecommerce marketplace. For example, the recommender system 100 can collect and store customer interaction data for customers' interactions with the ecommerce marketplace that include items browsed, viewed, rated, purchased, returned and the like. Such actual data can be used to determine items that are often substituted for items or for items that are purchased with another item. For example, the customer interaction data can include actual or historical customer interaction data that can show that customers often or repeatedly purchase peanut butter and also purchase jelly. With such data, the recommender system 100 can recommend that a customer purchase jelly when the customer has placed peanut butter in his/her virtual cart.

In a similar manner as that explained above, the actual or historic customer interaction data may not have data or have enough data to make a recommendation for each item in the ecommerce marketplace. In these instances, the private recommendation model 306 can be trained to predict a rating for each item and then to minimize the difference between the historical customer interaction data and the predicted recommendations using the methods described above. The private recommendation model can use collaborative filtering, matrix factorization as described above.

As can be appreciated, malicious users may have some knowledge regarding the use of various methods in retailers' recommender systems. In such instances, the malicious users can use their knowledge of recommender systems to inject poisoning data into the recommender system to corrupt or otherwise alter the items that are recommended by the recommender systems in a manner that aligns with the malicious user's intent. For example, the malicious user may desire to artificially raise the likelihood that an unreviewed or new product is recommended to customers by the retailer's recommender system. The malicious user can inject poisoning data in the form of fake purchase data that shows the purchase of a popular item with the new or unreviewed item. This can, for example, raise the likelihood that the new or unreviewed product will be shown as a recommended item when a customer views or purchases the popular item.

In other examples, the malicious users can inject fake ratings for the target item using other types of data poisoning attacks that can include a random attack, an average attack, an Average over Popular (AoP) attack and/or a Bandwagon attack. The methods and apparatuses of the present disclosure can operate to minimize and/or reduce the effects of such data poisoning attacks.

To minimize and/or reduce the effects of such data poisoning attacks, the private recommendation model 306 can be made differentially private as defined above. Various methods can be used to make the recommendation model 306 differentially private. In some examples, the private recommendation model 306 is the model that uses differentially private matrix factorization. In other examples, posterior sampling using Stochastic Gradient Langevin Dynamics (SGLD), user and item bias term, rating normalization or objective regularization.

In one example, differentially private matrix factorization can be used to make the private recommendation model 306 differentially private. In such an example, the privacy engine 304 can user posterior sampling. In this example, the matrix factorization can be made differentially private by sampling from the posterior using Stochastic Gradient Langevin Dynamics (SGLD) where matrices U and V can be sampled from the distribution $$P(U, V) \propto \exp\left(\frac{-\epsilon}{4B}F(U, V)\right) \quad \text{**Equation 3}$$

where $$F(U, V) = \sum_{i,j \in \mathcal{R}} (r_{ij} - \langle u_i, v_j \rangle)^2 + \lambda(\|U\|_2^2 + \|V\|_2^2). \quad \text{**Equation 4}$$

The privacy engine 304 can use other methods and techniques in combination with the sampling described above such as trimming and re-weighing. In such examples, a maximum number of ratings r can be fixed and excess ratings can be trimmed. In other examples, other methods and techniques can be used to make the private recommendation model differentially private.

Figure 4:
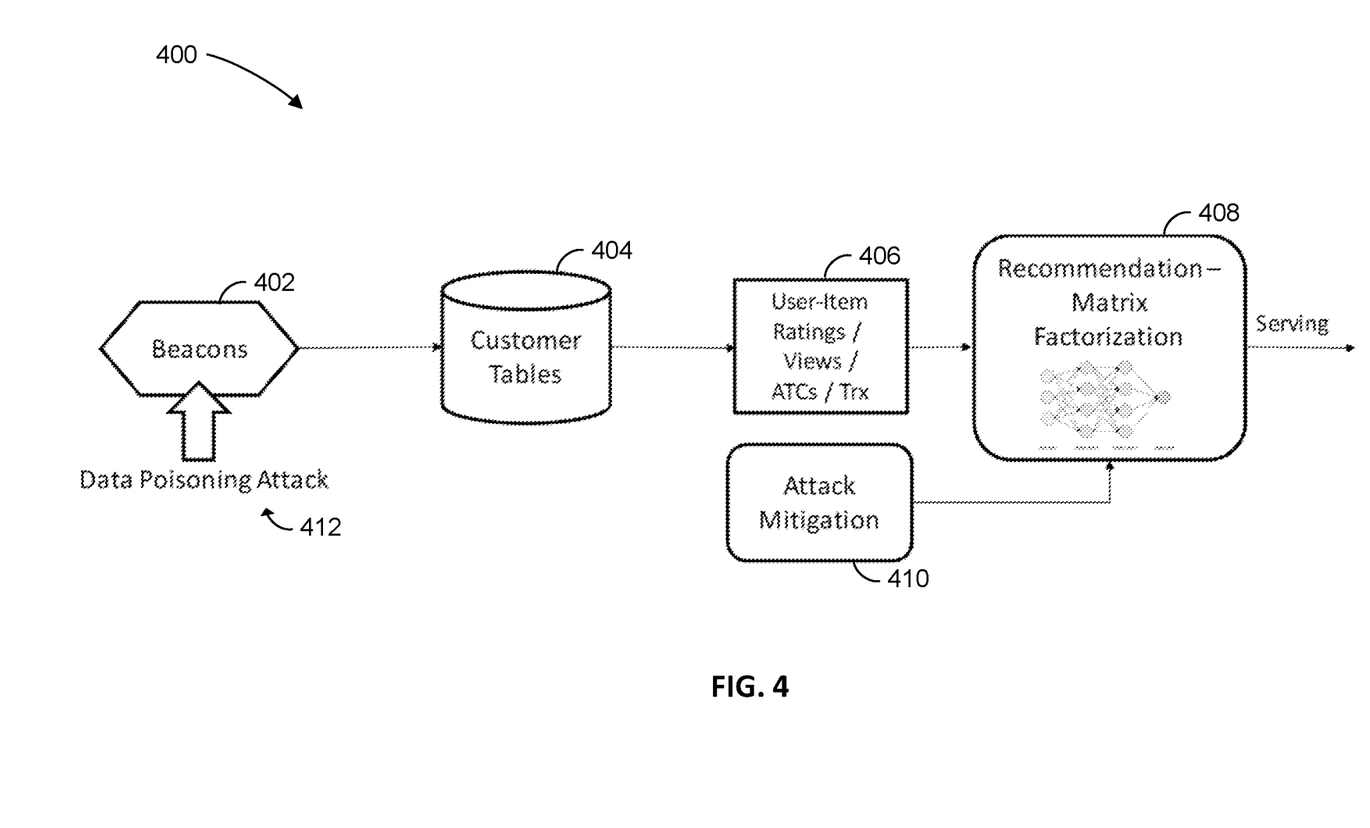
FIG. 4 is an illustration of an example recommender system in accordance with some embodiments.

Turning now to FIG. 4, an example architecture of a recommender system 400 is shown. In this example, the recommender system 400 can include the beacons 402, customer tables 404, user-item ratings 406, recommendation—matrix factorization 408, and attack mitigation 410. In this example, the beacons 402 can be collection of data that can be used by the recommender system 400 to provide recommendations to customers. The beacons 402 can include, for example, the customer interaction data previously described. The beacons 402 can be organized or otherwise processed into customer tables 404. The customer tables 404 can be, for example, the customer interaction data organized in a manner and stored for further use by the recommender system 400. For example, the customer tables 404 can be stored in database 108.

The recommender system 400 can also process and/or create the user-item ratings 406. The user-item rating 406 can be decomposed into user and item matrices U and V previously described. The recommendation—matrix factorization 408 can include the private recommendation model 306 previously described. The recommendation—matrix factorization 408 can operate to provide recommendations to customers that maybe interacting with the ecommerce marketplace.

The attack mitigation 410 is the element of the recommender system 400 that can minimize or reduce the effects of a data poisoning attack 412. As shown in FIG. 4, the attack mitigation 410 operates by performing operation in the recommendation—matrix factorization 408. As discussed above, these operations can cause the recommendation—matrix factorization 408 to be made differentially private. The recommender system 400 operates differently than traditional attack mitigation methods and systems by taking action on the recommendation model or recommendation—matrix factorization 408. Traditional attack mitigation methods and apparatuses often attempt to identify the data poisoning attack 412 when it is introduced into system and then to isolate and/or remove the data poisoning attack 412. Instead, the recommender system 400 operates to minimize or reduce the effects of the data poisoning attack 412 by making the recommendation model differentially private.

The methods and apparatuses of the present disclosure can also differ over other systems that may use differentially private models because such other applications of differentially private models attempt to maintain the privacy of individual user such as in a medical or health record setting. The methods and apparatuses of the present disclosure, in contrast, are used not to share results of individual records or to share data privately but to minimize and/or reduce the effects of data poisoning attacks.

In one example, the methods and apparatuses described above were tested in which a dataset of 100,000 ratings for various items were used. The dataset included 943 users and 1682 different items. The data included actual or historical user data for ratings on a scale of 1 to 5 for the items. The dataset was then used to train a recommendation model (without differential privacy). In this test, the non-private recommendation model was trained using Stochiastic Gradient Descent (SGD) methodology. The same dataset was also used to train a private recommendation model. In the test, the differentially private recommendation model was trained using Stochiastic Gradient Langevin Dynamics (SGLD) methodology. The models were then tested using various types of data poisoning attacks. In the test, a random attack, an average attack, an Average over Popular (AoP) attack, a Bandwagon Random attack, and a Bandwagon Average attack was used. The attacks included poisoning data that is intended to improve the likelihood that a Target item is shown as a recommendation by the recommendation model.

Figure 5:
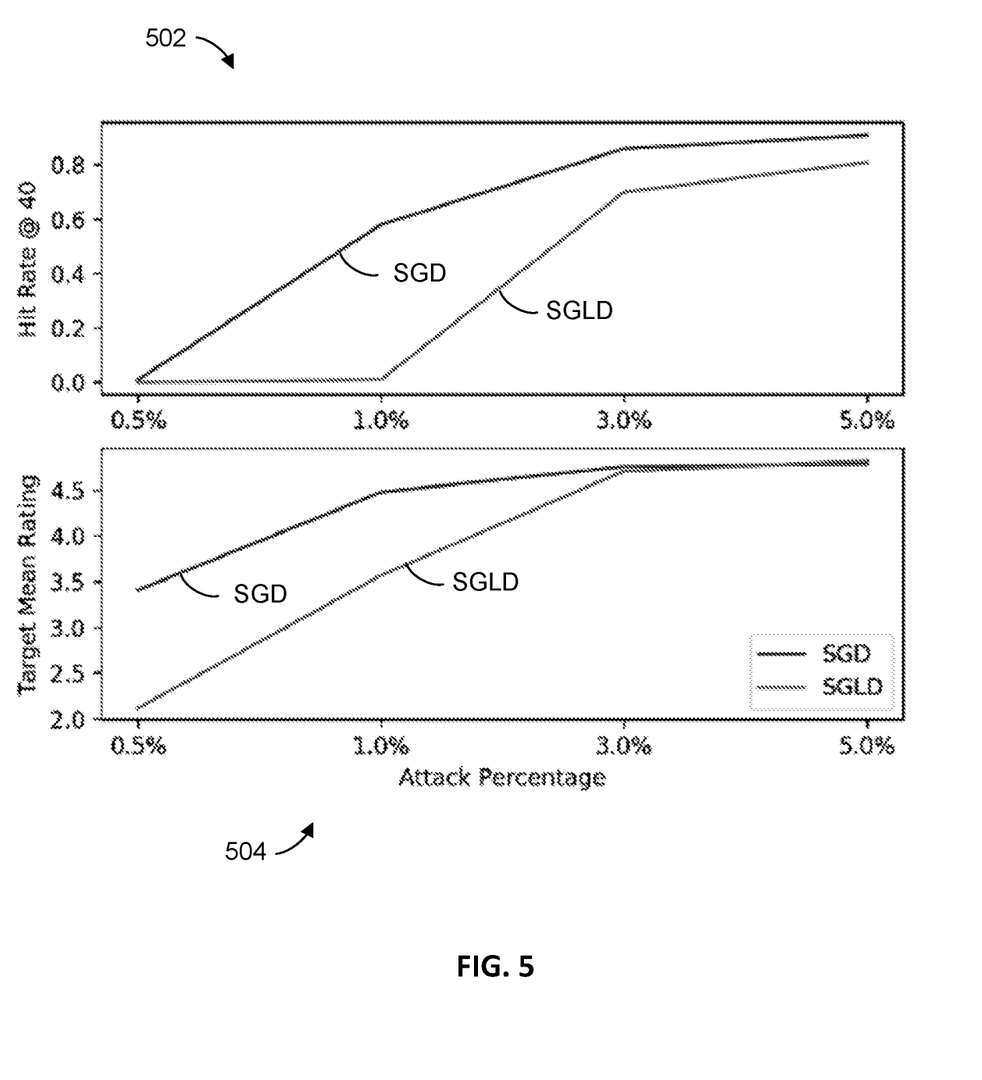
FIG. 5 shows graphs illustrating test performance of a traditional recommender system versus an example recommendation recommender system of the present disclosure.

After injecting the poisoning data into the test data, the effects of the attacks were measured compared between the non-private (SGD) recommendation model and the differentially private (SGLD) recommendation model. The differentially private (SGLD) recommendation model had an improved performance over the non-private (SGD) recommendation model. Example results for each model are shown in FIG. 5 for one item in the data set. A Hit Rate @ 40 is shown in graph 502. A Target Mean Rating is shown in graph 504. As can be seen, the Hit Rate @ 40 is lower for the differentially private (SGLD) than for the non private (SGD). The Hit Rate @ 40 measures the fraction of users for whom the Target item is returned as a recommendation within their top 40 recommended items. The Target Mean Rating is also lower for the differentially private (SGLD) recommendation model for many of the attacks. The Target Mean Rating is the average predicted rating of the Target item.

Figure 6:
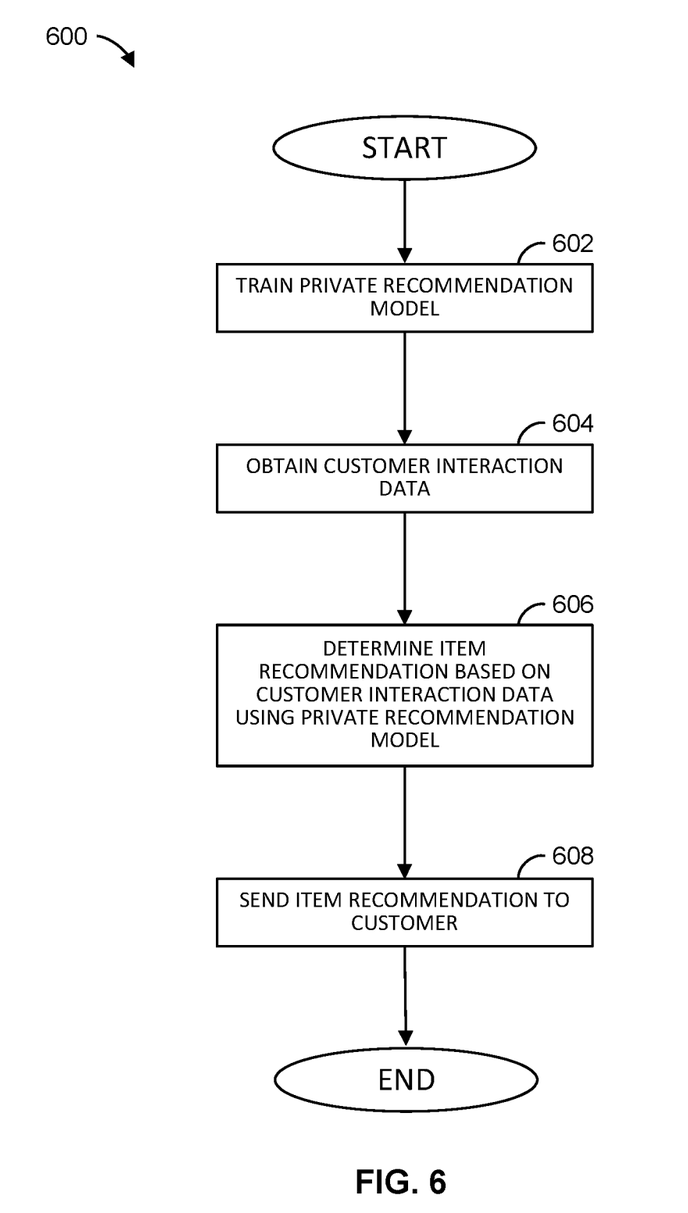
FIG. 6 is a flowchart of an example method of defending against data poisoning attacks in accordance with some embodiments.

Turning now to FIG. 6, an example method 600 of defending against a data poisoning attack is shown. The method 600 is described using the elements of the example recommender system 300 previously described. It should be appreciated, however, that the method can be performed by other example recommender systems, including recommender system 100, 400 or others.

At step 602, a private recommendation model can be trained. The private recommendation model can be trained using any suitable methodology, including the method 700 (FIG. 7) described below. In some examples, the private recommendation model is a differentially private machine learning model. The private recommendation model can be trained using any suitable methodology such as differentially private matrix factorization. In addition, other operations can be applied to make the model differentially private such as posterior sampling, trimming, re-weighing or the like.

At step 604, the defender computing device 102 can obtain customer interaction data. The customer interaction data can characterize a customer's interaction with a ecommerce marketplace. For example, the customer interaction data can include information about a customer's browsing, selection, viewing or purchasing of items on the ecommerce marketplace. The defender computing device 102 can use any suitable methodology to obtain the customer interaction data. For example, the data engine 302 can retrieve the customer interaction data from the central ordering computing device 114 and/or from the database 108.

At step 606, the defender computing device 102 can determine an item recommendation based on the customer interaction data using a private recommendation model. The private recommendation model can be a differentially private machine learning model. The private recommendation model can be trained using any suitable methodology such as differentially private matrix factorization. In connection with such methodology, suitable operations can be applied to make the model differentially private such as posterior sampling, trimming, re-weighing or the like. In the event that the ecommerce marketplace has been the subject of a data poisoning attack, the defender computing device 102 is less likely to be effected by the data poisoning attack. In other words, the defender computing device is more likely to determine the same item recommendation after poisoned data is injected into the customer interaction data than a recommendation model that is not privately trained. The fact that the defender computing device 102 includes a differentially private recommendation model causes the recommender system to defend against the data poisoning attack.

At step 608, the defender computing device 102 can send the item recommendation to the customer. For example, the defender computing device 102 can send the item recommendation to the central ordering computing device 114 and/or to another web server that can deliver the information for display on a customer computing device 104, 106.

Figure 7:
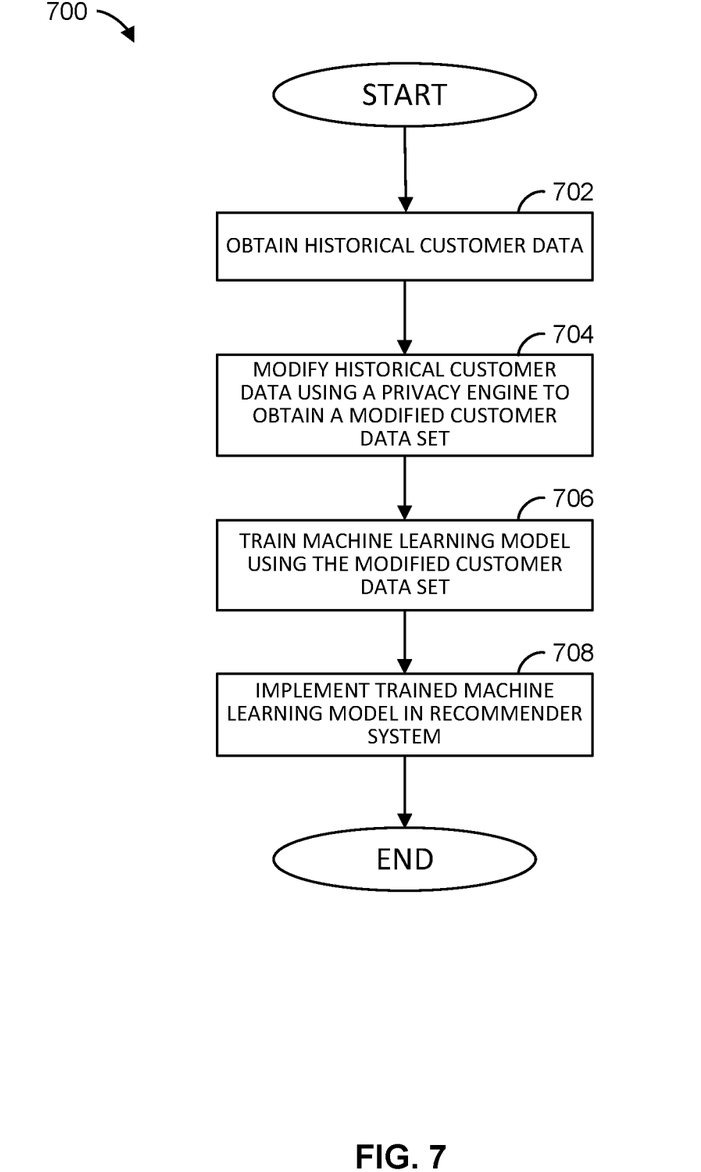
FIG. 7 is a flowchart of an example method of training a private recommendation model in accordance with some embodiments.

As stated above, the method 600 includes step 602 that includes the training of the private recommendation model. FIG. 7 shows one example method 700 of training the private recommendation model. At step 702, the defender computing device 102 can obtain historical customer data. The customer data can include customer interaction data and other data that can characterize a customer's interactions with the ecommerce marketplace. The customer data can be obtained using any suitable technique. In one example, the data engine 302 can obtain the historical customer data from the database 108 and/or the central ordering computing device 114. The historical customer data can include actual data that can describe a customer's interactions on the ecommerce marketplace in the past.

At step 704, the defender computing device 102 can modify the historical customer data using a privacy engine to obtain a modified customer data set. The privacy engine 304 can modify the historical customer data using techniques to allow a machine learning model trained with the modified customer data set to defend against data poisoning attacks. In some examples, the privacy engine can modify the historical customer data to make the data differentially private. In some examples, the privacy engine can use sampling, posterior sampling, trimming and/or re-weighing of the historical customer data. For example, the privacy engine can perform posterior sampling for the learned latent vectors for user and items during training of the machine learning model.

At step 706, a machine learning model can be trained using the modified customer data set. In some examples (and as discussed above), the machine learning model can be a collaborative filtering model that can use matrix factorization. In other examples, other methods and models can be used. As a result of the operations in step 704 and 706, the machine leaning model can be a differentially private matrix factorization based model that can operate to determine recommendations using various techniques, such as the process described above in method 600.

At step 708, the trained machine learning model can be implemented in a recommender system, such as in recommender system 100, 300 or 400.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
  a computing device configured to:
    obtain customer interaction data characterizing customer interactions of a customer with an ecommerce marketplace;
    determine an item recommendation based on the customer interaction data using a trained differentially private recommendation model, wherein the trained differentially private recommendation model is more likely to determine the same item recommendation after poisoned data is injected into the customer interaction data than a recommendation model that is not privately trained; and
    send the item recommendation to the customer.

2. The system of claim 1, wherein the trained differentially private recommendation model comprises a trained differentially private machine learning model.

3. The system of claim 1, wherein the trained differentially private recommendation model is trained using differentially private matrix factorization.

4. The system of claim 3, wherein the differentially private matrix factorization uses posterior sampling to preserve differential privacy.

5. The system of claim 4, wherein the posterior sampling is performed using Stochastic Gradient Langevin Dynamics to sample latent user and item representations while training the trained differentially private recommendation model.

6. The system of claim 1, wherein the customer interaction data comprises rating data that characterizes a rating of an item in the ecommerce marketplace.

7. The system of claim 1, wherein the item recommendation comprises a recommendation for an item not purchased or rated by any customer on the ecommerce marketplace.

8. The system of claim 1, wherein the trained differentially private recommendation model is trained using a training method comprising:
  obtaining customer data characterizing interactions with an ecommerce marketplace for a plurality of customers;
  modifying the customer data using a privacy engine that samples, trims or reweighs the customer data to obtain a modified customer data set; and
  training a machine learning model using the modified customer data set.

9. A method comprising:
  obtaining customer interaction data characterizing customer interactions of a customer with an ecommerce marketplace;
  determining an item recommendation based on the customer interaction data using a trained differentially private recommendation model, wherein the trained differentially private recommendation model is more likely to determine the same item recommendation after poisoned data is injected into the customer interaction data than a recommendation model that is not privately trained; and
  sending the item recommendation to the customer.

10. The method of claim 9, wherein the trained differentially private recommendation model comprises a trained differentially private machine learning model.

11. The method of claim 9, wherein the trained differentially private recommendation model is trained using differentially private matrix factorization.

12. The method of claim 11, wherein the differentially private matrix factorization uses posterior sampling to preserve differential privacy.

13. The method of claim 12, wherein the posterior sampling is performed using Stochastic Gradient Langevin Dynamics to sample latent user and item representations while training the trained differentially private recommendation model.

14. The method of claim 9, wherein the customer interaction data comprises rating data that characterizes a rating of an item in the ecommerce marketplace.

15. The method of claim 9, wherein the item recommendation comprises a recommendation for an item not purchased or rated by any customer on the ecommerce marketplace.

16. The method of claim 9, wherein the trained differentially private recommendation model is trained using a training method comprising:
  obtaining customer data characterizing interactions with an ecommerce marketplace for a plurality of customers;
  modifying the customer data using a privacy engine that samples, trims or re-weighs the customer data to obtain a modified customer data set; and
  training a machine learning model using the modified customer data set.

17. A non-transitory computer readable medium having instructions stored thereon, wherein the instructions, when executed by at least one processor, cause a device to perform operations comprising:

obtaining customer interaction data characterizing customer interactions of a customer with an ecommerce marketplace;

determining an item recommendation based on the customer interaction data using a trained differentially private recommendation model, wherein the trained differentially private recommendation model is more likely to determine the same item recommendation after poisoned data is injected into the customer interaction data than a recommendation model that is not privately trained; and sending the item recommendation to the customer.

* * * * *